Jan. 1, 1929.　　　　　　　　　　　　　　　　1,697,096
T. T. TUTTLE
REVERSING DEVICE FOR MARINE PROPULSION
Filed May 5, 1926　　　2 Sheets-Sheet 2
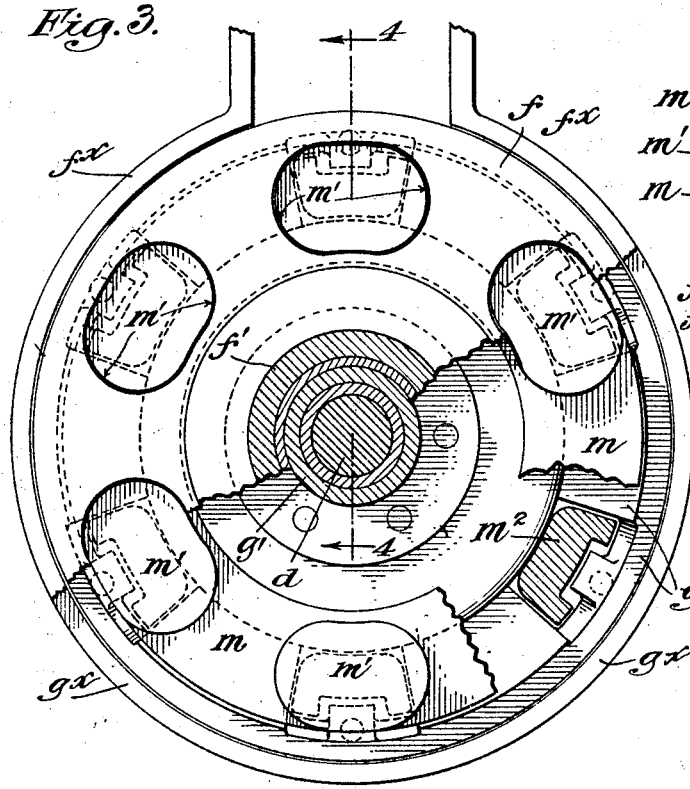
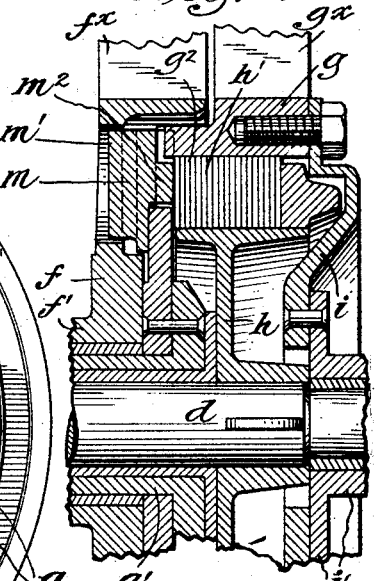
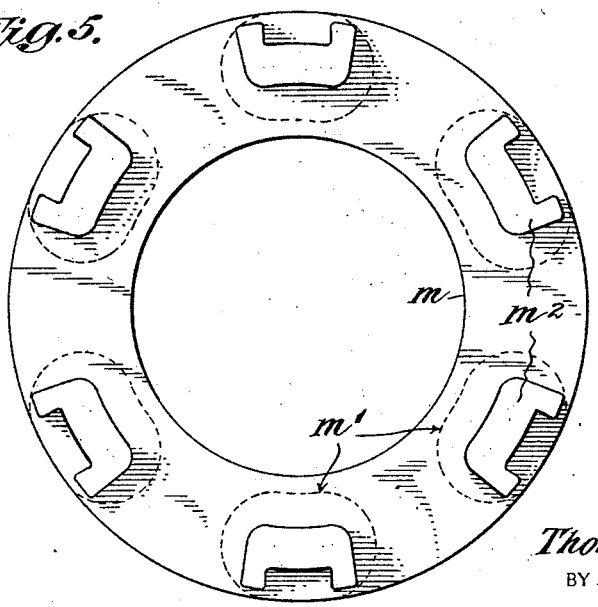
INVENTOR
Thomas T. Tuttle
BY his
ATTORNEYS Patented Jan. 1, 1929.

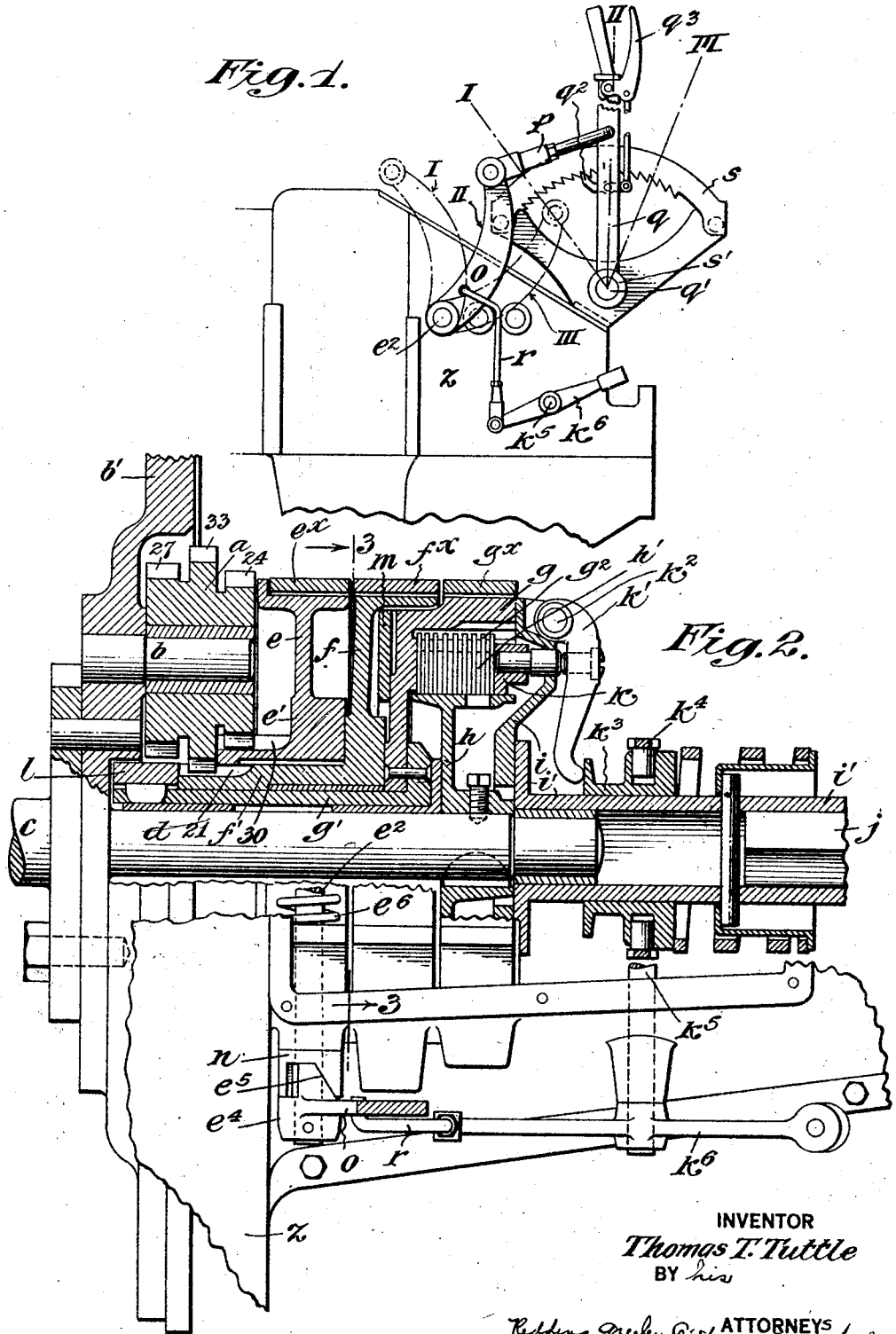

1,697,096

UNITED STATES PATENT OFFICE.

THOMAS T. TUTTLE, OF NORWALK, CONNECTICUT.

REVERSING DEVICE FOR MARINE PROPULSION.

Application filed May 5, 1926. Serial No. 106,808.

This invention relates to devices designed to adapt the Ford automobile motor to marine engine use. The Ford engine, as is well known, is equipped with a planetary type of transmission wherein the gears are always in mesh, high speed being effected by a direct drive from the crank shaft to the propeller shaft and the gear combinations for slow speed and reverse being attained through the instrumentality of clutching devices similar in many respects to the brake drum and brake band, affecting the propeller shaft of that engine. In marine propulsion braking is obviously ineffectual, reliance being placed instead upon a reversal of the rotation of the propeller to retard the headway of the boat. This necessitates reverse mechanism which will rotate the propeller shaft at a speed greater than that ordinarily contemplated for vehicles. According to the present invention the boat is intended to be driven in a forward direction by the usual Ford direct drive or high speed. No low speed forward is contemplated but the low speed pair of gears are availed of instead of the usual driving and driven gears in the gear combination whereby a lower gear ratio is attained for the transmission of power in reverse to cause the rotation of the propeller shaft at a higher speed. This is effected by removing the driven gear carried with the brake drum and causing the low speed drum and brake drum to turn as a unit for the transmission of power. One aspect of the invention contemplates the unitary rotation of the low speed drum and brake drum through the instrumentality of devices which shall not necessitate modification of the existing Ford structures in the interest of simplicity. To this end an adapter ring as it may be called is interposed between the respective drums and is formed with driving lugs upon both faces so shaped and disposed as to fit within existing apertures formed within the walls of the respective drums.

It is also an object of the present invention to effect the operation of the engine by a single instrumentality. Accordingly a simple lever is provided which may be pushed ahead for forward speed and drawn back for reverse, suitable connections being provided such that upon moving the lever forwardly, the clutch is operated to effect the direct drive or Ford high speed, while movement rearwardly initiates the reverse drive.

These and other objects of the invention and the means for their attainment will be more apparent from the following detailed description of a preferred embodiment of the invention illustrated in the accompanying drawings, in which:

Figure 1 is a view in side elevation showing the transmission housing and the operating lever for marine use applied thereto.

Figure 2 is a plan view, partly in horizontal section, showing the modified transmission according to the present invention.

Figure 3 is a transverse vertical sectional view taken in the plane indicated by the line 3—3 in Figure 2 and looking in the direction of the arrows and showing the adapter ring and its means of connection with the adjacent drums.

Figure 4 is a fragmentary sectional view taken in the vertical plane indicated by the line 4—4 in Figure 3, looking in the direction of the arrows and showing in particular the details of the connector ring in cross section.

Figure 5 is a view in front elevation of the adapter ring according to the invention.

Reference is first to be had to Figure 2 wherein is shown in plan and partly in horizontal section the planetary transmission conventional with Ford automobiles but modified in accordance with the invention to evolve a transmission particularly adapted to marine uses. In the transmission as devised for automobiles three sets of triple gears or sun pinions (one set of which is shown at $a$) are rotatably mounted upon triple pinion shafts $b$, carried with the flywheel $b'$. These sun pinions have been designated as 27, 33 and 24, respectively, since they are each usually formed with that number of teeth. The flywheel is secured to the crank shaft $c$ and the transmission shaft $d$, upon which are mounted the clutching devices adapted to render one of the pinions effective, is bolted to the flywheel in axial prolongation of the crank shaft. The clutching devices comprise three drums, namely, in order from the flywheel, the reverse dum $e$, the slow speed drum $f$ and the brake drum $g$ and these drums are carried respectively upon the rearward ends of concentric sleeves $e'$, $f'$, $g'$, which are formed forwardly with gears constantly in mesh with the respective sun pinions. The gear carried with the reverse gear sleeve has been numbered 30 for the reason that it is provided normally with 30 teeth. It meshes with pinion 24 of the set of sun pinions $a$. Similarly the slow speed gear has been numbered 21 and meshes with pinion 33. A driven gear is provided on the end of the brake drum sleeve in the automobile transmission and meshes with pinion 27, but is not shown in Figure 2 because this connection is dispensed with in the adapted transmission as will be more fully described hereinafter. As is well known the Ford transmission has only two forward speeds, to-wit low and high. In high gear the transmission rotates as a unit with the flywheel. The path of power is from the crank shaft $c$ to the transmission shaft $d$ through the disc drum $h$ keyed thereon and the small discs $h'$ mounted on the disc drum and from thence to the brake drum $g$, drive plate $i$, sleeve $i'$ and universal shaft $j$. Frictional engagement is effected between these small discs and the large discs $g^2$ carried on the brake drum $g$ by moving the clutch push ring $k$ inwardly thereagainst by means of the clutch finger $k'$ which is pivoted upon the clutch finger pin $k^2$ carried on the drive plate $i$. The drive plate $i$ is secured at its outer edge to the brake drum $g$ and at its inner edge to a sleeve $i'$ and thus, when the clutch disc drum $h$ and brake drum $g$ are clutched together by the disc clutch, the universal shaft $j$ and crank shaft $c$ rotate in unison. Actuation of the clutch finger $k'$ is, of course, effected by the sliding sleeve $k^3$ or clutch shift which bears on the end of the finger and is reciprocated by a clutch yoke $k^4$ carried on the rock shaft $k^5$ turned by the clutch lever $k^6$.

The high speed just described is the only forward speed availed of by the modified transmission for marine use according to the present invention. The slow speed, which is normally obtained by holding the slow speed drum $f$ stationary by the band $f^x$ is not used as it evidenced by the absence of the usual foot pedal connections with that band. In marine propulsion braking is obviously ineffectual, reliance being placed instead upon a reversal of the direction of rotation of the propeller to retard the headway of the boat. The brake band $g^x$ is, therefore, also rendered ineffectual and operating mechanism is provided only for the reverse drum band $e^x$.

The reverse speed adapted for vehicles is much too slow to serve to retard the headway of a boat. With the transmission as arranged for the automobile the reverse drive is effected at the desired speed for vehicles in the following manner: The reverse band $e^x$ holds the reverse drum stationary. The gear 30 attached to it is also held stationary. The reverse triple pinion 24 which meshes with gear 30 has only 24 teeth. As the 24 tooth pinion makes one turn around the 30 tooth gear it will have traveled 30 teeth or a gain of 6 teeth for itself, 6 teeth on 24 is just one-quarter of a revolution gain for the 24 tooth pinion. The 27 tooth pinion also gains one quarter of a turn. Thus the 27 tooth driven gear is rotated backwards through an angle equal to that which the 27 tooth drive pinion gains. Therefore, the driven pinion will be turned back one-quarter of a revolution of the flywheel. Every four revolutions of the engine when the reverse drum is held stationary produces one backward revolution of the driven gear, brake drum and drive plate since they are all keyed together. In other words assuming the Ford engine speed at 1600 R. P. M. the speed of the propeller shaft in reverse will be 400 R. P. M. This is much too slow to be effective for satisfactorily retarding the headway of a boat. To gain a higher R. P. M. in reverse the following structural modifications are made. The 27 tooth gear on the end of the brake drum sleeve $g'$ is removed and a plain annular collar $l$ or spacer is keyed thereon for the purpose merely of maintaining the relation of parts while affording no driving connections between the two 27 tooth gears. Instead the reverse drive is effected through a higher gear ratio and the slow speed drum connection is availed of for this purpose. Accordingly the slow speed drum $f$ and the brake drum $g$ are united by an adapter $m$ which has a driving connection with each drum so that the slow speed drum $f$ and brake drum $g$ turn in unison. Now by holding the reverse drum $e$ stationary and with it, of course, gear 30, the pinion 24 makes a gain of six teeth as before or one quarter of a revolution. At this time the pinion 33 is also making a gain of one-quarter revolution or advancing eight and one-quarter teeth or a travel of thirty-three plus eight and one-quarter or forty-one and one-quarter teeth. But as pinion 33 is traveling about the gear 21 that gear is turning backwards, so that the actual advance of pinion 33 is forty-one and one-quarter minus twenty-one or twenty and one-quarter or $\frac{81}{4}$. So for every revolution of the engine the twenty-one tooth gear (which meshes with the thirty-three tooth gear) is turned backward $\frac{81}{4} \times \frac{1}{21}$ or $\frac{27}{28}$ of a revolution. Therefore, the speed of the engine in reverse by the use of the improved transmission is $\frac{27}{28}$ or 96$\frac{3}{7}$% of the forward speed of the engine.

Of course various means may be availed of to cause the rotation as a unit of the slow speed and brake drum. Figures 3 to 5 illustrate a connecting ring or adapter $m$ which has been devised for this purpose with the object of adapting it to standard Ford construction and assembling without the aid of tools or the necessity of drilling holes etc. Accordingly the annulus is provided formed upon one face with a plurality of lugs $m'$ which enter the usual apertures formed in the slow speed drum. Upon the opposite face other lugs $m^2$ are formed which engage the apertures in the brake drum. Thus when the adapter is in position as shown in Figures 2 and 4 the slow speed drum $f$ and the brake drum $g$ are caused to rotate in unison and when the reverse drum $e$ is held stationary the drive is obtained through the gears having a lower ratio.

In motor boat operation it is convenient to control the operation of the engine by a single lever which is moved ahead for forward speed and back for reverse. The present device lends itself readily to such control, since there is only the direct and reverse drives and the clutch to be affected. Accordingly the rod $e^2$ by which the reverse drum band $e^x$ is tightened is permitted to extend through a stationary cam bracket $n$ and is provided at its end $e^4$ with a cam surface $e^5$ such that when the end $e^4$ is rotated the shaft $e^2$ is forced out against the action of the reverse band spring $e^6$ in the usual manner to tighten the band on the drum. Rotation of the end $e^4$ is effected by the formation thereon of a special arm $o$ which is connected by the link $p$ to the operating lever $q$ which may be conveniently mounted on the top of the transmission housing $z$ as shown in Figure 1. Forward movement of this lever about the pivot $q'$ to say the position I is availed of to obtain the forward drive which as has been explained before is effected by simply clutching the clutch disc $h$ to the drive plate $i$. The usual lever $k^6$ is utilized and to obtain the rotation of the shaft in the right direction it, the lever, is connected by a suitable curved link $r$ as shown to the arm $o$. Thus movement of the lever $q$ forwardly will cause rotation of lever $k^6$ in a clockwise direction as viewed in Figure 1. To effect neither reverse nor forward speed the lever is placed in a neutral position II in that figure. Moving the lever to the rear as at III causes the clutching of the reverse drum band $e^x$ as will be understood. To maintain the lever in the various operative positions a toothed quadrant $s$ is supported on the pivot bearing $s'$ and a dog $q^2$ releasable by the spring pressed handle $q^3$ is carried on the lever $q$.

It is thought that the operation of the improvements and their construction are apparent from the foregoing description. By the structures disclosed a Ford automobile transmission has been modified and adapted to marine uses in such manner that but one speed forward is provided and a reverse speed is afforded which is higher than that utilized for the automobile to effectively retard the headway of a boat. Further control or actuating instrumentalities are so associated with the improved devices that the movement of a simple lever in the direction desired serves to initiate the desired movement of the boat.

Various modifications will occur to those skilled in the art, in the configuration and disposition of the adapting devices as well as in the co-ordination of the various operations and their control by a single instrumentality adapted for manual operation. Further, some aspects of the invention are equally capable of use individually as well as in the combination as a whole.

What I claim is:

1. The method of rendering effective for marine use an automobile planetary transmission of the character described, having a driving element, planet pinions carried thereby and provided with a plurality of sets of gear teeth, a driven element, a low speed drum, a reverse drum, a brake drum, and a clutch, said drums being formed with sleeves having gear teeth thereon for co-operation with the respective sets of gear teeth on the planet pinions, and a plurality of bands for co-operation with the said drums, consisting in removing the gear teeth on the low speed drum sleeve, disengaging the low speed and brake bands, and inserting means to cause the low speed and brake drums to rotate as a unit.

2. In a planetary transmission of the character described having a driving element, planet pinions carried thereby and provided with a plurality of sets of gear teeth, a driven element, a low speed drum, a reverse drum, a brake drum, and a clutch, said drums being formed with sleeves having gear teeth thereon for co-operation with the sets of gear teeth on the planet pinions, in combination, means to replace the gear teeth on the low speed drum sleeve, means to cause the low speed and brake drums to rotate as a unit, a lever and operative connections between the lever and the reverse drum and the clutch such that movement of the lever in one direction causes rotation of the driven element with respect to the driving element in one direction and movement of the lever in the opposite direction causes rotation of the driven element in the opposite direction.

3. In a planetary transmission of the character described having a driving element, planet pinions carried thereby and provided with a plurality of sets of gear teeth, a driven element, a low speed drum, a reverse drum, a brake drum, and a clutch, said drums being formed with sleeves having gear teeth thereon for co-operation with the sets of gear teeth on the planet pinions, in combination, a collar to replace the gear teeth on the low speed drum sleeve, an adapter element to cause rotation of the low speed and brake drums as a unit, a lever, and means connecting the lever, reverse drum and the clutch for simultaneous movement whereby movement of the lever in one direction causes rotation of the driven element with respect to the driving element in one direction and movement of the lever in the opposite direction causes rotation of the driven element in the opposite direction.

4. In a planetary transmission, in combination, a driving element, a plurality of planet pinions having a plurality of sets of teeth cut in the periphery thereof carried with the driving element, a plurality of drums carried freely with a prolongation of the driving element, operative connections between one of said drums and a driven shaft comprising a clutch, teeth cut in a sleeve carried with said drum for engagement with one of the sets of teeth on the planet pinions, teeth cut in a sleeve carried with another of said drums for engagement with another of the sets of teeth on the planet pinions having a lesser number of teeth than the last above named set, a lever, operative connections between the lever and the clutch whereby the driven shaft is rotated at engine speed with the lever in one position, and operative connections between the lever and the last named drum whereby the drum is held stationary and the driven shaft rotated at substantially the same speed in the reverse direction with the lever in another position.

5. A transmission of the character described having a driving element, a driven element, a low speed drum, a reverse drum and a brake drum, a clutch, a planetary transmission gearing, means to connect the drums to the gearing, and means to engage the drums wherewith to selectively vary the rate, and change the direction of rotation of the driven element with respect to the driving element, in combination, means to cause the low speed and brake drums to rotate as a unit, means operatively associated with the clutch to cause rotation of the driven element with respect to the driving element in one direction, and means operatively associated with the reverse drum to cause rotation of the driven element in the reverse direction.

6. In a transmission of the character described having a driving element, a driven element, a low speed drum, a reverse drum, a brake drum, and a clutch, said drums being operatively associated with planetary transmission gearing wherewith to selectively vary the rate and change the direction of rotation of the driven element with respect to the driving element in combination, means to connect the drums to the planetary transmission gearing, means to cause the low speed and brake drums to rotate as a unit, means to cause rotation of the driven element in one direction at the same rate of speed as the driving element, and means to cause rotation of the driven element in the reverse direction at substantially the same rate of speed as the driving element.

7. In a marine engine, the combination with the crank and propeller shafts, of a compound planetary pinion revolving with said crank shaft; a clutch including a driving member carried by said crank shaft and a driven member carried by said propeller shaft; a gear carried by the driven member of said clutch and meshing with one member of said planetary pinion; a rotatably supported reverse drive drum provided with a gear meshing with another member of said planetary pinion; a brake mechanism for said drum, and a single control lever for selectively operating the clutch and the brake mechanism for said drum.

8. In a marine engine, the combination with the crank and propeller shafts, of a compound planetary pinion revolving with the crank shaft; a clutch including a driving member fast on said crank shaft and a driven member connected with said propeller shaft, said driven member carrying a gear meshing with one member of said planetary pinion; a reverse drive gear meshing with another member of said planetary pinion, and a single control member for said clutch and said reverse drive gear.

9. In a marine engine, the combination with a crank shaft, a fly wheel thereon and a propeller shaft, of a set of compound planetary pinions rotatably mounted on said fly wheel; a clutch including a driving member fast on said crank shaft and a driven member connected with said propeller shaft, said driven member being provided with a gear meshing with one member of each of said planetary pinions; a reverse drive drum loosely supported by said crank shaft and provided with a gear meshing with the other members of said planetary pinions; brake mechanism for said drum; operating mechanism for said clutch, and a single control member for selectively operating the brake for the drum and the clutch operating mechanism, said control member having a neutral position in which both the brake mechanism and the clutch are released.

10. A modified Ford automobile engine in which the brake drum and slow speed drums are fastened rigidly together and wherein the usual gear on the brake drum sleeve is dispensed with, the combination with a brake mechanism for the reverse drum of the engine and operating mechanism for the clutch, and a single control device for selectively operating both of said mechanisms.

This specification signed this 27" day of April A. D. 1926.

THOMAS T. TUTTLE.